July 10, 1923.
C. G. CLEMENT
1,461,412
TRAILER COUPLING
Filed Oct. 22, 1919
2 Sheets-Sheet 1
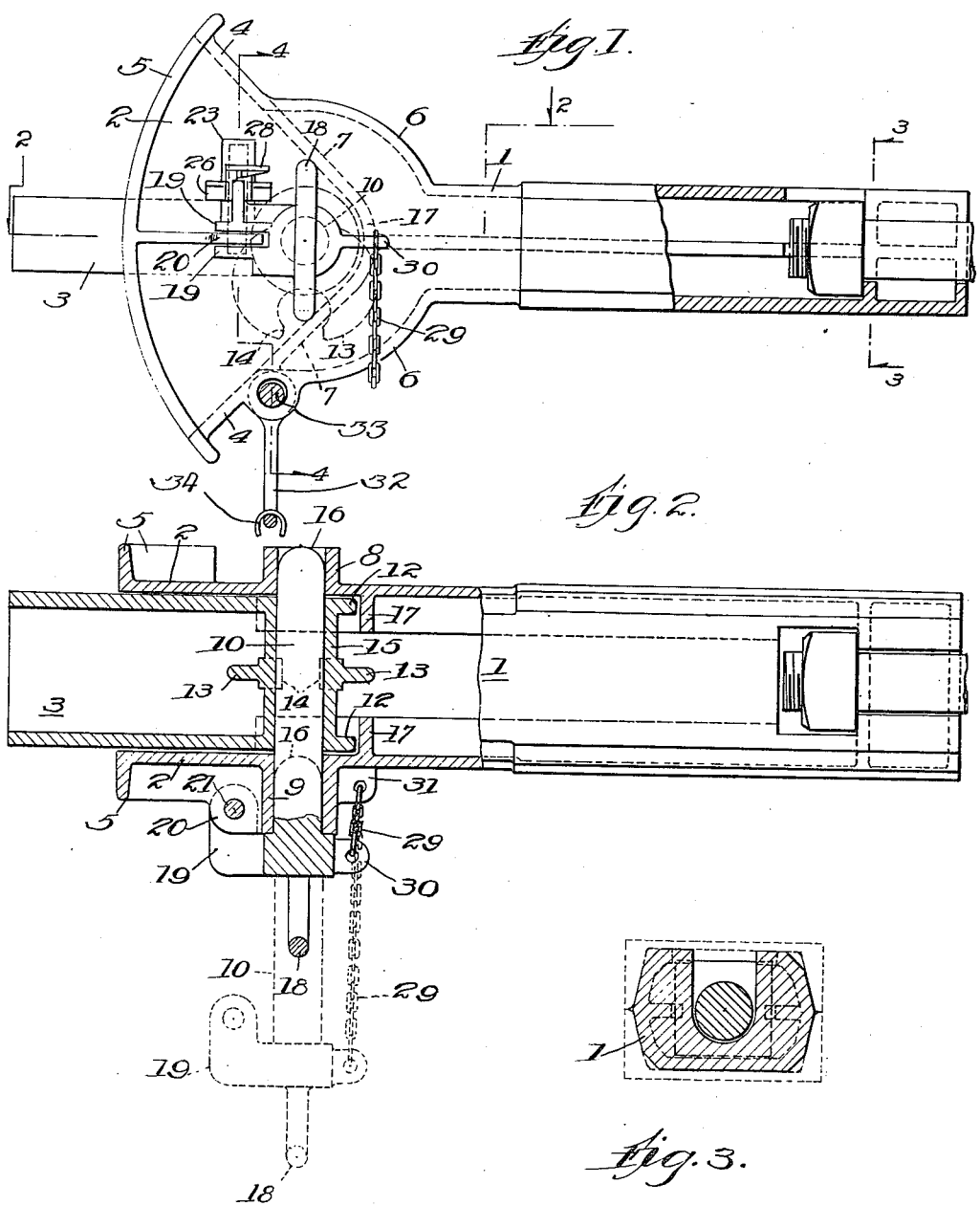
Inventor;
Charles G. Clement,
by Burton & Burton
his Attys
Witness;

July 10, 1923.
C. G. CLEMENT
1,461,412
TRAILER COUPLING
Filed Oct. 22, 1919
2 Sheets-Sheet 2
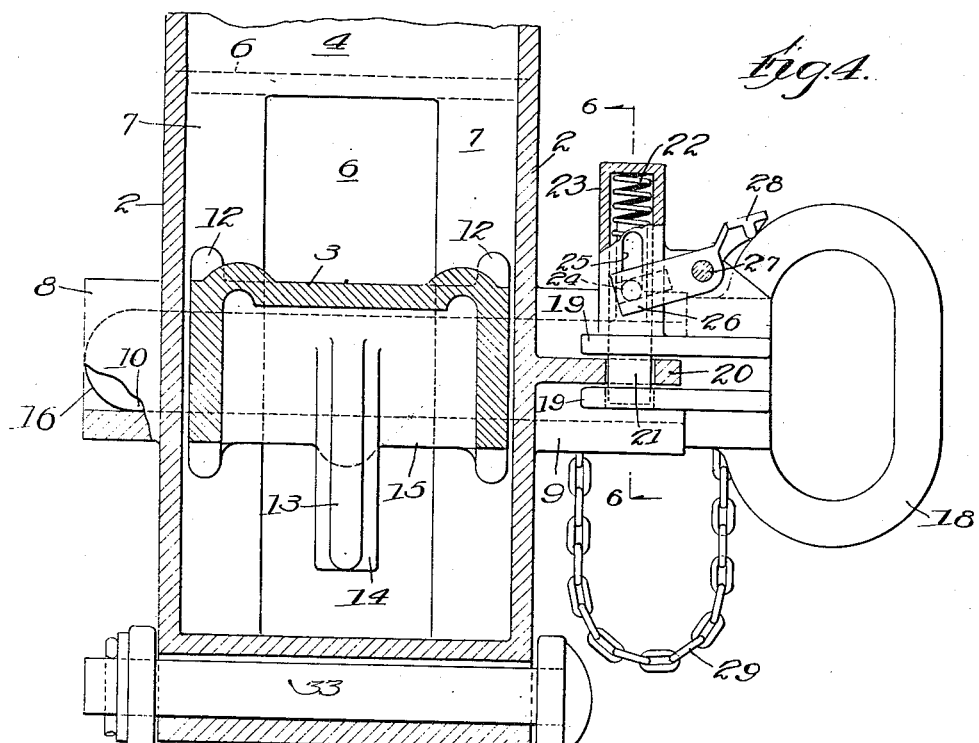
Fig. 4.
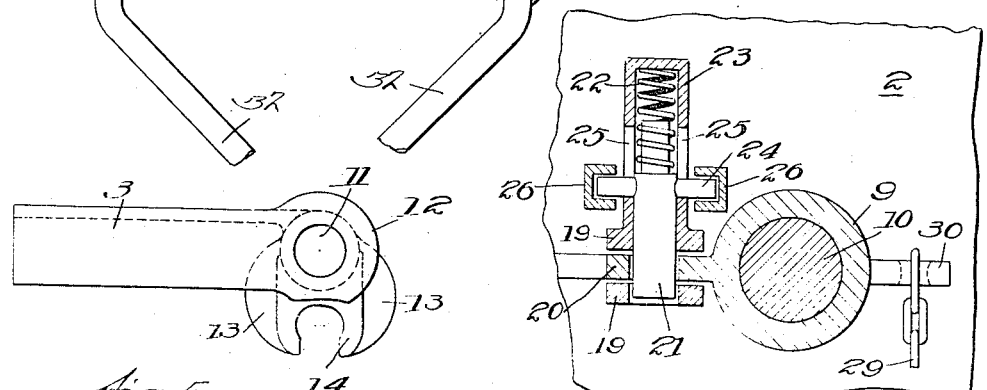
Fig. 5.
Fig. 6.
Inventor;
Charles G. Clement,
by Burton & Burton
his Attys.

Patented July 10, 1923.

1,461,412

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

TRAILER COUPLING.

Application filed October 22, 1919. Serial No. 332,363.

*To all whom it may concern:*

Be it known that I, CHARLES G. CLEMENT, a citizen of the United States, and a resident of Edgerton, in the county of Rock and the State of Wisconsin, have invented certain new and useful Improvements in Trailer Couplings, of which the following is a specification, reference being had to the accompanying drawings, forming a part thereof.

The purpose of this invention is to provide a coupler suitable for connecting a trailer adapted for travel on ordinary roads to a tractor vehicle such as an automobile or motor truck, the coupling being constructed to permit of vertical play of the vehicles with respect to each other but forming a transversely rigid connection through which the trailer may be steered to follow substantially in the track of the vehicle which hauls it. The invention consists of the features and elements and their combinations, hereinafter described and shown in the drawings as indicated by the claims.

In the drawings:

Figure 1 is a side elevation of a coupler embodying this invention.

Figure 2 is a horizontal section of the same, taken as indicated at line, 2—2, on Figure 1.

Figure 3 is a transverse detail section, taken as indicated at line, 3—3, on Figure 1.

Figure 4 is a detail vertical section, taken as indicated at line, 4—4, on Figure 1.

Figure 5 is a side elevation of a coupling link or terminal for a draw bar to co-operate with the coupler as indicated in other figures of the drawing.

Figure 6 is a detail section taken as indicated at the line, 6—6, on Figure 4.

The coupler embodying this invention is especially adapted for use on a four-wheel trailer of dirigible type, and as shown in Figure 1, is supplied with a shank, 1, which may be cast integrally with the coupler head composed of parallel vertical walls or cheeks, 2, between which there is accommodated the coupling link or draw bar, 3, having vertical play between the two which is limited by the upper and lower diverging walls, 4. Preferably the forward edges of the cheeks are curved as shown in Figure 1, and said cheeks, 2, and transverse walls, 4, are faced with a peripheral flange, 5. Externally the walls, 4, 4, are connected with the shank, 1, by convex rearwardly extending walls, 6, 6, but internally the straight-line directions of the walls, 4, are continued in flanges, 7, extending inwardly and toward each other from the side walls of the coupler head, but spaced apart therein. The side walls are formed with annular bosses, 8 and 9, surrounding openings which receive the transverse coupling pin, 10. The end of the draw bar, 3, is formed with an eye, 11, and the end portion of said draw bar is of circular outline as indicated at 12 concentric with said eye, 11, except for a depending portion including a rib, 13, and a hook, 14, reinforced by said rib, for which rib and hook clearance is provided in the space between the flanges 7, at the rear of the pocket formed by the side walls 2, and connecting walls, 4, of the coupler head.

Preferably the draw bar, 3, is made up as a hollow cast member, and its eye, 11, is formed in a tubular connection, 15, extending between its lateral flanges, as indicated in Figures 2 and 4. The end of the coupling pin, 10, may be spherically rounded as at 16, so that if the curved edges, 12, of the lateral flanges of the draw bar, 3, are entered in the coupler head so far as to contact with the curved connecting portion, 17, from which the flanges, 7, extend tangentially, the slight disalignment of the eye, 11, with openings in the annular bosses, 8 and 9, will not prevent entry of the coupling pin, 10, therethrough.

In backing a trailer to a loading platform, or switching to make up a train, it is found convenient to have means in addition to the coupler for temporarily and quickly connecting the trailer with the tractor vehicle; for that purpose there is provided the hook, 14, integral with the coupling link, shown in detail in Figure 5, which may be hooked onto any convenient part of the frame as for instance the heavy corner rings which are usually supplied for the purpose, thereby affording means for making connections which would be impossible with the coupler regularly used in transit. It is to be understood that the couplers are mounted for a limited lateral swing, and that the coupler and draw bar must be substantially in alignment before the trailer and tractor can be connected in the usual way.

For manipulating the coupling, 10, it is preferably formed with a handle, 18, at one end. At one side of the pin adjacent the handle, a pair of spaced lugs, 19, extend just above and below an apertured rib, 20, formed in the angle between one of the cheeks, 2, and the annular boss, 9, and a locking plunger, 21, mounted slidably in registering apertures in said lugs, 19, normally extends through the aperture of the rib, 20, for retaining the coupling pin, 10, in the position shown in full line in the drawings, in which it extends through the coupler head. A spring, 22, housed in a socket, 23, formed on the upper side of the upper lug, 19, yieldingly holds the plunger, 21, in locking position, while a cross pin, 24, in the plunger extends through slots, 25, in the socket, 23, for engagement with the arms, 26, of a bifurcated lever, fulcrumed at 27, and formed with a thumb piece, 28, adjacent the handle, 18, so that pressure on said thumb piece will raise the plunger out of engagement with the apertured rib, 20, and permit the coupler pin, 10, to be withdrawn laterally.

Such withdrawal of the coupler pin, 10, however, is limited by providing a check chain, 29, connecting a lug, 30, adjacent the handle, 18, with a lug, 31, formed on the coupler head, the chain, 29, being of such length as to permit the pin, 10, to be withdrawn only from the annular boss, 8, and through the coupler head chamber, but not entirely through the bearing boss, 9. This not only prevents the coupling pin, 10, from dangling into possible contact with the road, but also facilitates its re-insertion in the eye, 11, of the draw bar at will.

It sometimes occurs through inadvertence that the coupler becomes disengaged, and to prevent accident, the safety chain, so called, is provided, with one end usually attached to the side of the coupler, with the result that where the coupler shank is interconnected with steering devices, the wheels will be turned out of their proper alignment by a side pull on the coupler; and to prevent such side stress, there is provided a clevis spanning the coupler head, and secured thereto by a pin, 33. The said clevis, 32, is shaped with its sides forming a rather sharp angle in the corner of which the safety chain, 34, finds lodgment, and hangs in a vertical plane coincident with the medial line of the coupler head.

I claim:—

1. The combination of a draft member having a transverse bore; a coupling head having spaced walls to receive said draft member with apertures positioned to register with said bore and a coupling pin adapted to occupy said apertures and the bore of the draft member, said coupling head having an apertured rib exteriorly formed adjacent the aperture of one wall, the coupling pin having a pair of ribs positioned to extend at opposite sides of said rib on the head, all three ribs having apertures arranged to register when the coupling pin is in operative position, and a spring-pressed plunger carried by the coupling pin in position to penetrate said registered apertures for removably locking the pin in position.

2. The combination of a draft member having a transverse bore; a coupling head having spaced walls to receive said draft member with apertures positioned to register with said bore, and a coupling pin adapted to occupy said apertures and the bore of the draft member, said coupling head having an apertured rib exteriorly formed adjacent the aperture of one wall; a spring-pressed plunger carried by the coupling pin in position to penetrate the aperture of said rib for removably locking the pin in position, said pin being formed with a rigid handle at one end and a thumb piece fulcrumed on the pin adjacent the handle engaging the plunger, and adapted to be rocked upon its fulcrum for releasing said plunger from the apertured rib of the head.

3. A coupling head comprising side walls spaced apart to receive a draft member and apertured to receive a coupling pin, said head being exteriorly formed with flanges extending inwardly from the side walls respectively, said flanges being concentrically formed about the axis of said apertures and being spaced apart from each other to leave a slot-like opening to accommodate a medially-formed projection on the draft member.

In testimony whereof I have hereunto set my hand at Edgerton, Wis., this 14th day of October, 1919.

CHARLES G. CLEMENT.